Oct. 6, 1959   J. MARKESTEIN ET AL   2,907,283
RAILWAY VEHICLE SUSPENSION
Filed Sept. 30, 1955   4 Sheets-Sheet 1

INVENTORS
John Markestein &
C. Hugo Patrie
BY J. C. Thorpe
ATTORNEY

Oct. 6, 1959  J. MARKESTEIN ET AL  2,907,283
RAILWAY VEHICLE SUSPENSION

Filed Sept. 30, 1955  4 Sheets-Sheet 2

INVENTORS
John Markestein &
C. Hugo Patrie
BY J.C. Thorpe
ATTORNEY

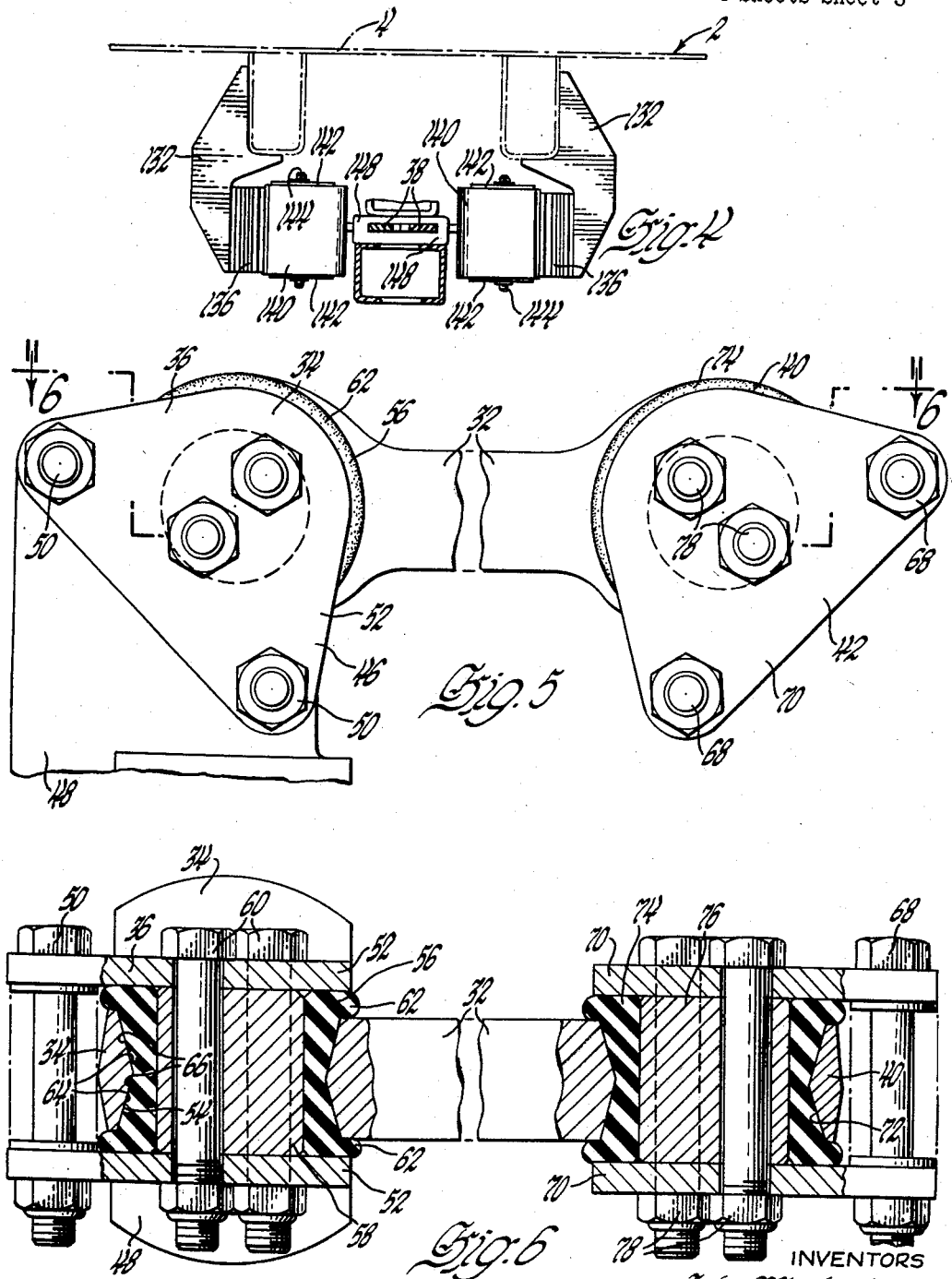

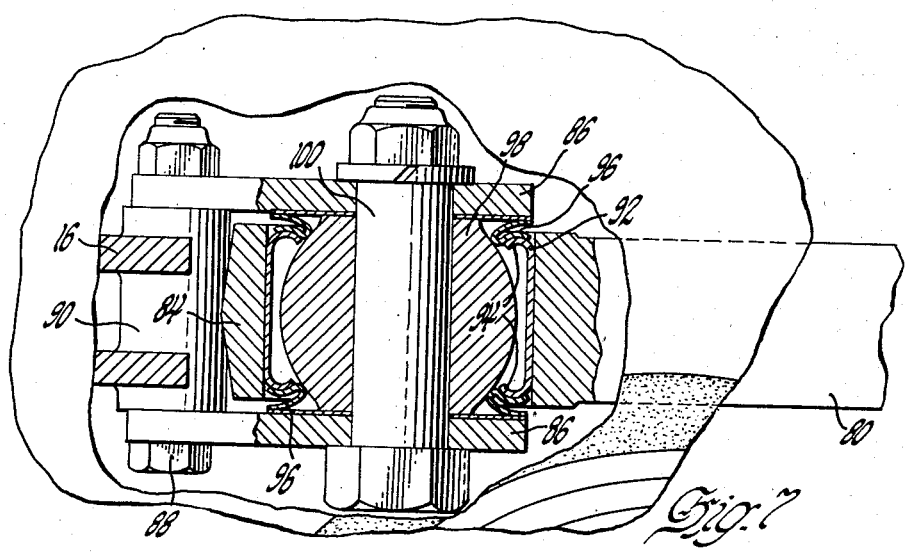
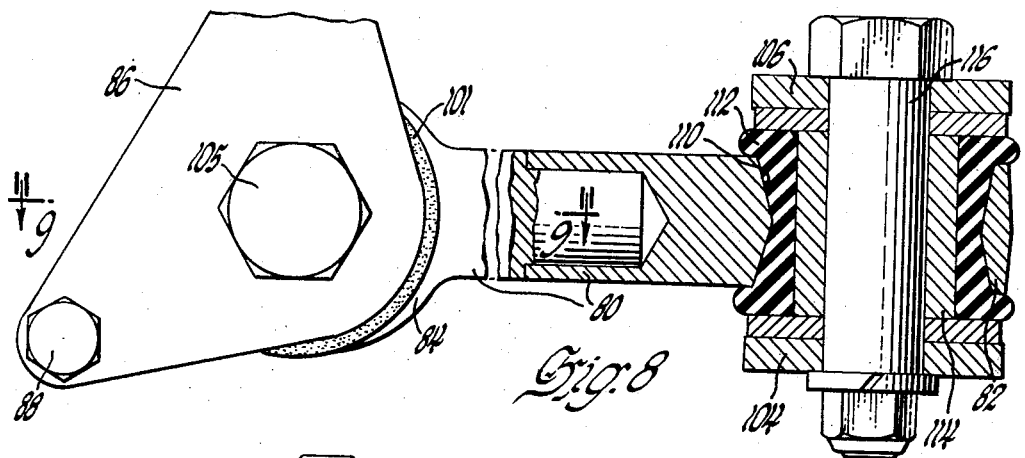
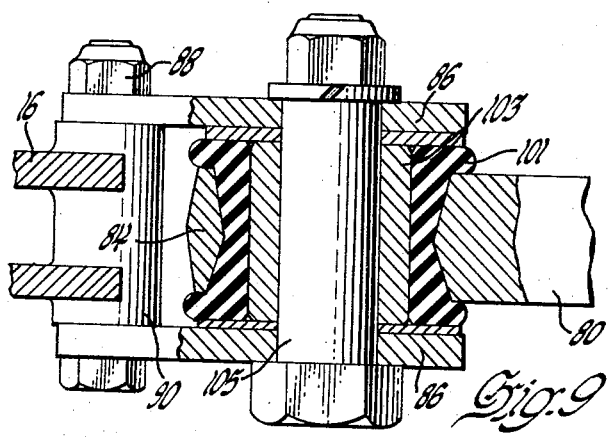

United States Patent Office 2,907,283
Patented Oct. 6, 1959

2,907,283
RAILWAY VEHICLE SUSPENSION

John Markestein, Westchester, and Clarence Hugo Patrie, La Grange, Ill., assignors to General Motors Corporation, Detroit, Mich., a corporation of Delaware Application September 30, 1955, Serial No. 537,799

3 Claims. (Cl. 105—199)

This invention relates generally to vehicle suspensions and more particularly to a suspension especially adapted for a railway vehicle.

There is an increasing tendency on the part of the railroads, in order to reduce the annual deficit realized in operating their passenger service, to employ for such service new lightweight passenger trains whose first cost is relatively small. In this way it is theorized it will be much more economical to scrap such trains and purchase new ones then to attempt to maintain and repair them thereby eliminating much of the previous expense of maintenance and repair. Such lightweight trains, however, present certain problems, one of the more important of which is a suspension for the cars thereof which will overcome the riding defects normally accompanying the lighter weight of such cars.

It is hereby proposed for these cars or coaches to use the recently innovated air bellows as cushioning means between the body of the coaches and the trucks which support the ends of these coaches. The use of such air bellows in combination with certain other features to be brought forth by the present invention it is felt will provide the quality of ride which will make the adoption of such lightweight coaches feasible.

To further reduce the weight and the cost and improve riding characteristics it is hereby proposed to provide a suspension which eliminates the usual four-wheel trucks including bolster and center bearing, etc., and substitute therefor a simplified, cheaply constructed truck assembly which utilizes a single wheel and axle set without any intermediate bolster and which does not pivot as in the case of more conventional trucks. The use of a single wheel and axle set, however, raises added difficulties of stability. Furthermore, in previous truck constructions it has been found desirable to provide a certain amount of relative lateral motion between the vehicle body and the wheels so that lateral irregularities in the rails can, to some extent, be absorbed by this lateral motion and at least partially prevented from being transmitted to the body proper of the vehicle. It will be apparent from the foregoing that to provide a single-axle truck which has relative lateral motion with respect to the main body of the vehicle raises even further problems of stability.

In addition to the above problems another difficulty which is encountered in the use of a single wheel and axle set which is not accompanied by the usual bolster and center bearing is the matter of properly aligning the wheel and axle set relative to the vehicle body in an inexpensive and simple manner. This problem of alignment is again complicated by the fact that to provide a truly superior ride there must be a limited amount of lateral movement between the vehicle body and the wheel and axle set.

It is therefore broadly an object of the present invention to provide a new lightweight suspension for a railway vehicle.

It is a further object of this invention to provide a lightweight suspension for a railway vehicle which has limited movement laterally with respect to the underside of the railway vehicle.

It is still another object of this invention to provide a lightweight suspension which resiliently supports one end of the railway vehicle body so that the body can move both laterally and vertically with respect to the wheels of the suspension and to provide suitable means for damping this lateral and vertical movement.

A further object of the invention is to provide means for aligning the truck with the vehicle so that the wheels thereof are maintained parallel to the longitudinal center line of the vehicle.

Another object of the present invention is to provide a novel suspension for one end of a railway vehicle which includes a truck frame journalling the ends of a single wheel and axle set and which includes unique means for stabilizing this frame relative to the vehicle end.

A still further object of the invention is to provide unique means for damping and limiting the aforementioned vertical and lateral movements.

For a fuller understanding of the above and other objects of this invention reference may be had to the accompanying detailed description and drawings, in which:

Figure 4 is an enlarged fragmentary view taken on the line 4—4 of Figure 1 and serves to indicate the novel means for limiting lateral movement of the frame relative to the vehicle body.

Figure 5 is an enlarged view taken on the line 5—5 of Figure 1 illustrating the novel radius rod which interconnects the center part of the truck frame to the underside of the end of the vehicle body.

Figure 6 is an enlarged view in section taken on the line 6—6 of Figure 5 illustrating the novel details of construction of the radius rod of Figure 5.

Figure 7 is an enlarged fragmentary view in section of the connection between the truck frame and the outboard radius rods.

Figure 8 is a view partially in section and serves to illustrate details of the opposite ends of the outboard radius rods which are connected to the bell cranks utilized to align the frame relative to the end of the vehicle.

Figure 9 is a view taken on the line 9—9 of Figure 8 to illustrate a modification of the ends of the outboard radius rods shown in Figure 7 which are connected to the truck frame.

Figure 1:
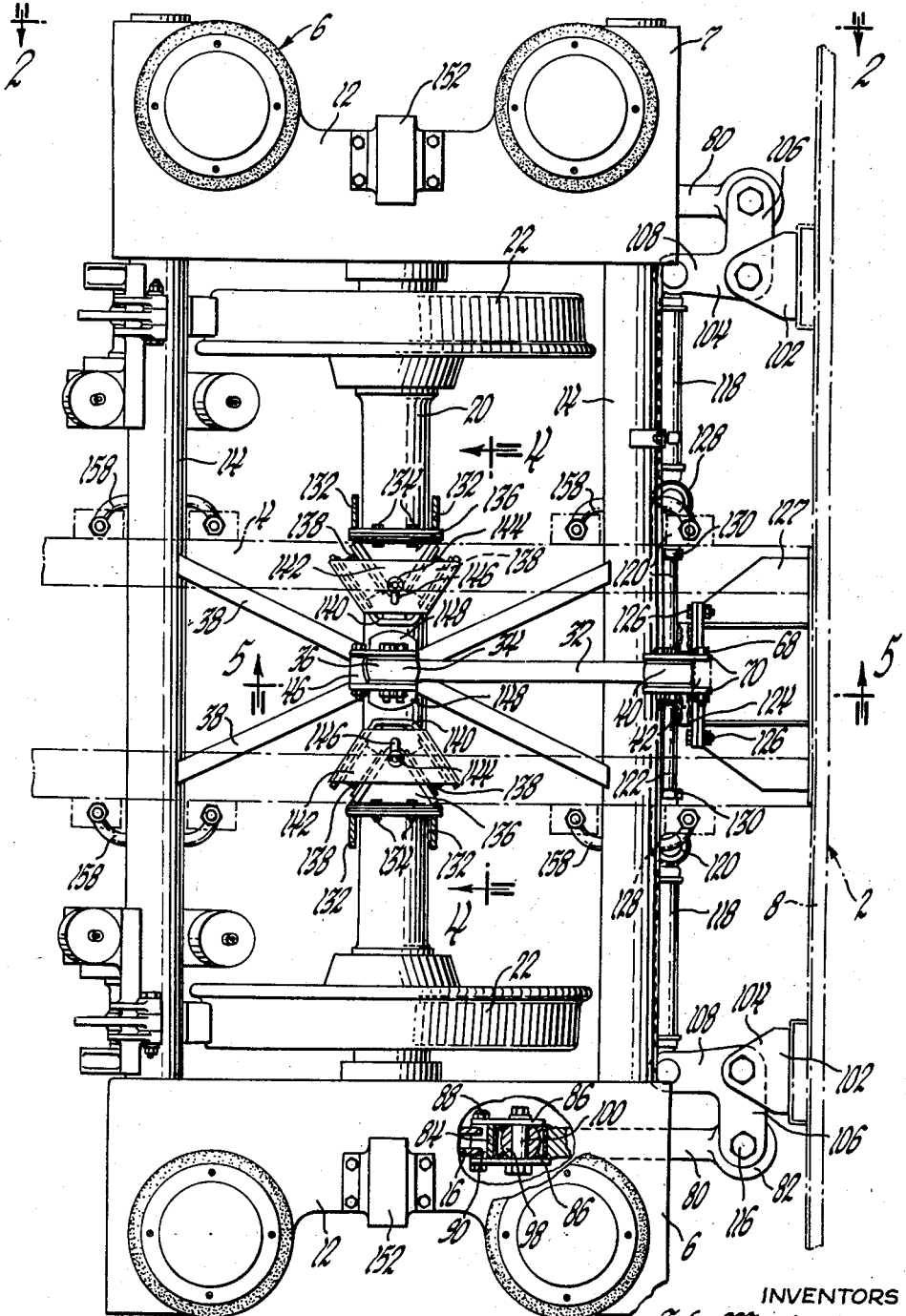
Figure 1 is a top elevation of one end of a railway vehicle shown in phantom with the novel suspension disposed transversely therebelow.
Figure 2:
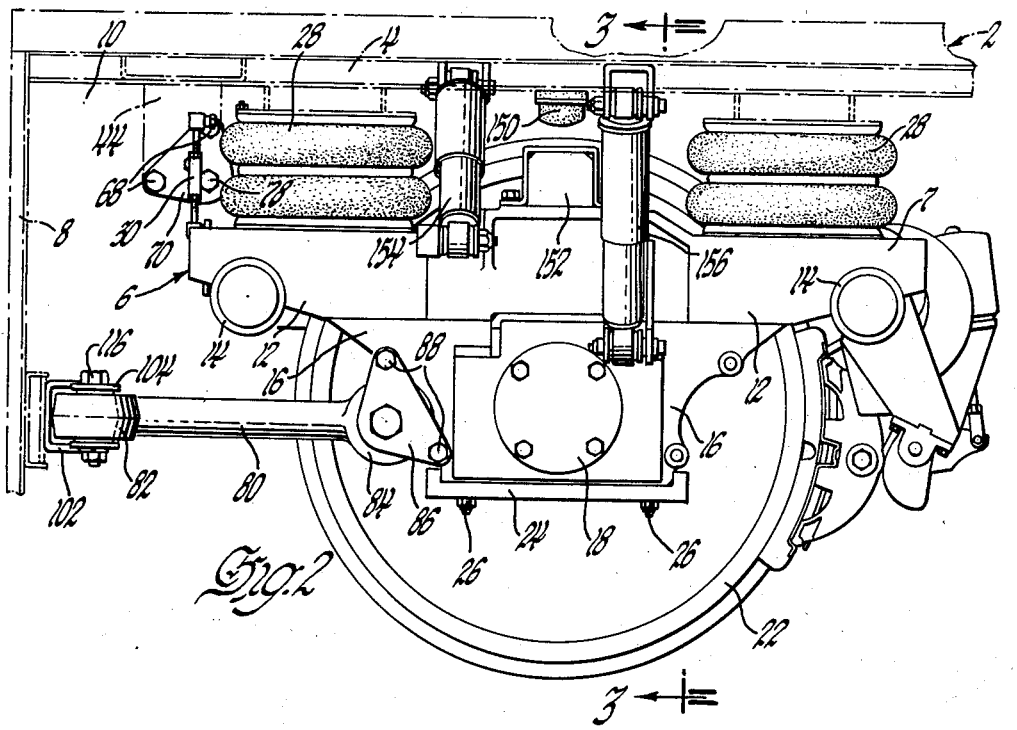
Figure 2 is a side view in elevation taken on the line 2—2 of Figure 1 and in part serves to illustrate the unique truck frame and how it is connected to the end of the vehicle.
Figure 3:
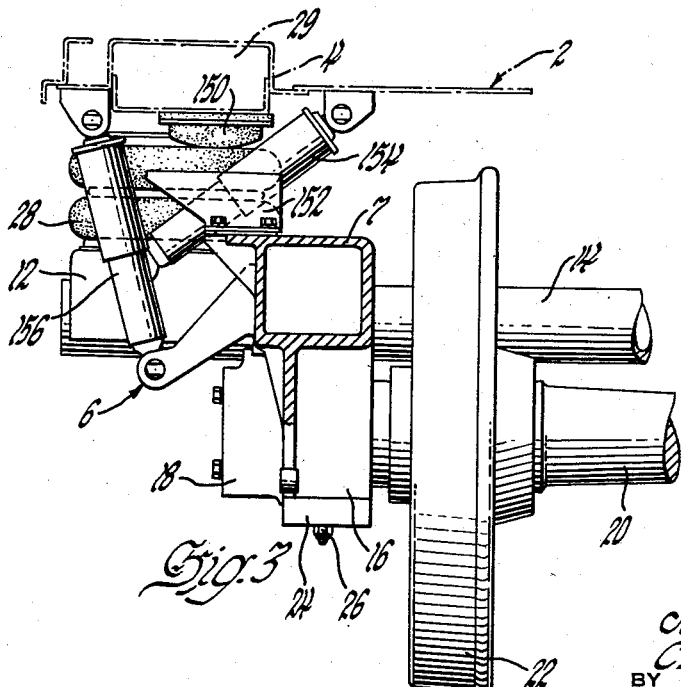
Figure 3 is a view taken on the line 3—3 of Figure 2 and particularly illustrates how the shock absorbing assemblies connected between the frame of the truck and the vehicle are horizontally and vertically disposed.

Referring first to Figures 1, 2 and 3 it will be observed that the invention is primarily related to two main structures—the vehicle body which is indicated generally by a numeral 2 and the novel truck which is disposed below an end 4 of the body and indicated generally by a numeral 6. For purposes of clarity the body and the few structural details thereof shown are in phantom. The body, as already mentioned, has an end 4 which as shown actually represents the underframe of the vehicle. Secured to the end 4 and spaced some distance toward the center away from the extreme end of the underframe is a bulkhead 8. The bulkhead 8 in combination with the end 4 forms a more or less rectangular recess 10 in which the suspension is disposed.

The suspension includes a truck frame 7 which is composed of a pair of laterally spaced, longitudinally extending wheel pieces 12 and a pair of longitudinally spaced, transversely extending tubular members 14 which are welded or otherwise suitably fixed to the wheel pieces 12 so as to form a substantially rigid rectangular frame. Each of the wheel pieces 12 includes a pair of longitudinally spaced, downwardly depending pedestal members 16 between which is received a journal box assembly 18. The journal box assemblies 18 act to rotatively journal opposite ends of a single axle 20 having pressed thereon the usual set of wheels 22. To retain the journal box assemblies between the sets of pedestals 16 a pedestal tie bar or strap 24 is suitably fastened to the ends of the pedestals, as for example by the studs 26.

As previously mentioned, the truck 6 is disposed in the recess 10 below the end 4 and resiliently supports the end 4 by means of four air bellows 28 interposed between the underside of the end 4 of the vehicle and the upper sides of the wheel pieces 12. These bellows 28 have their lower ends clamped into sealing engagement with the upper sides of the wheel pieces 12 and their upper ends clamped to the underside of the end of the vehicle 4. The upper ends of the bellows 28 are in communication with longitudinally extending chambers 29 (see especially Figure 3) integral with the underframe 2 of the vehicle. The bellows 28 may be pumped up or deflated according to the vertical distance between the underside of the end 4 and the wheel pieces 12 which is sensed by a unique valve mechanism indicated generally at 30 (see Figure 2). This valve mechanism controls the entry and exhausting of air from a suitable air source to the volume reservoirs 29 which, as already mentioned, are integral with the underframe 2.

From the foregoing description it will be appreciated that the truck frame and the end 4 of the vehicle can move laterally and vertically and longitudinally as well as rotatively with respect to each other because of the resiliency of the air bellows 28 provided between these two structures.

To provide stability for the truck assembly 6 so as to prevent it from moving longitudinally with respect to the end of the vehicle and also to prevent it from rotating relative to the end vehicle a plurality of radius rods have been provided between the frame 7 and the underside of the end 4 in what is believed to be a very unique manner. The first of these rods which is indicated by a numeral 32 is best observed in Figures 1 and 5. Rod 32 is pivotally connected at 34 directly to the frame 7 through the medium of a connection 36 (to be described in detail shortly) between the end 34 and a pair of cross pieces 38 rigidly secured to the tubular members 14 adjacent the transverse center of the truck. The radius rod 32 has its opposite end 40 pivotally fastened by means of a unique connection 42 (also to be described in more detail shortly) to a bracket 44 fixed to the underside of the end 4 of the vehicle in the recess 10. (See particularly Figure 2.)

Referring now to Figures 5 and 6 it will be seen that the connection 36 comprises a fabricated bracket 46 mounted on the cross pieces 38. The bracket 46 comprises a base member 48 having secured thereto by means of the bolt and nut assemblies 50 a pair of spaced plates 52. The fabricated end 34 of rod 32 is positioned between the plates 52 and has an eye 54 therein in which is inserted a rubber bushing 56 and a spacer bearing 58. The spacer 58 and the plates 52 are provided with aligned holes spaced from the axis of the bearing through which bolts 60 extend so as to prevent any rotation of the bearing with respect to the plates. The end 34 of rod 32 is of somewhat narrower depth than that of the spacer 58 so that the resilient bushing 56 may be formed with outer flanges 62 to prevent any metal-to-metal contact between the plates 52 and the end 34. The eye 54 is also provided with tapered inner surfaces 64 and 66. From the foregoing it will be appreciated that the connection between the radius rod 32 and the frame 7 is completely cushioned and, further, the construction allows pivotal action of the rod in a vertical plane through the rod. Also, because of the rubber bushing 56 there is a certain amount of universal movement which due to the tapered surfaces 64 and 66 is slightly enhanced without abnormal distortion of the bushing 56. The connection 42 for pivotally fastening the opposite end 40 to the underside of the end 4 of the railway vehicle is similar in construction to the connection 36 and acts in a similar manner. This connection includes the aforementioned bracket 44 having fixed thereto by means of the bolt assemblies 68 a pair of spaced plates 70. The plates 70 have interposed therebetween the end 40 which is provided with an eye 72 formed by tapered surfaces in which is positioned a rubber bushing 74 and a spacer 76 similar to the previously mentioned bushing 56 and spacer 58. The end 40 is pivotally secured between the plates 70 by means of bolt assemblies 78. This radius rod and its pivotal connections between the truck frame 7 and the underside of the end 4 of the vehicle tend to locate the frame longitudinally with respect to the vehicle body while at the same time allowing a certain amount of horizontal pivotal movement about the point 34. It will be appreciated, however, that radius rod 32 by itself is insufficient to prevent a certain amount of rotative action of the frame about the axle 20 relative to the vehicle end 4.

To further stabilize the frame relative to the vehicle end 4 and also align the frame so that it is properly maintained at substantial right angles to the longitudinal center line of the vehicle body at all times a pair of outboard radius rods 80 have been provided. The radius rods 80 includes ends 82 and 84 having eyes or holes extending therethrough whose axes are askew at right angles to each other. The end 84 of the rod 80 is connected to one of the pedestals 16 by means of spaced brackets 86 secured thereto by the bolt assemblies 88. The connection of the end 84 between the brackets 86 is shown in two forms, the first of which is particularly illustrated in Figure 7. As observed from Figure 7 the pedestal 16 has provided thereon a pair of bosses 90 through which the bolt assemblies 88 extend to secure the plates 86 in place. The end 84 which is interposed between the plates 86 is provided with a bushing or bushing bar 92 whose edges are spun over as indicated at 94. A pair of thin metal washers 96 and a spherically shaped spacer 98 are inserted in the eye of the end 84 and the entire assembly is secured between the plates 86 by means of a bolt assembly 100. This unique connection, as will be appreciated, also allows a certain amount of universal action between the pedestal 16 and the rod 80 which, however, is limited by the spacing between the edges of the spun portions 94 and the surface of the spherical spacer 98.

The modification shown in Figure 9 is practically identical with the connections 36 and 40 and includes the aforementioned boss 90 of Figure 7. Fixed to boss 90 by bolt assemblies 88 are the same plates 86. Between plates 86, however, is the rod end 84 similar in shape to the rod end 34. End 84 in the modification of Figure 9 includes a rubber bushing 101 and spacer 103 similar to the bushing 56 and spacer 58 of Figure 6. The end 84 in the modification of Figure 9 is pivotally secured between plates 86 by bolt assembly 105.

The connection between the end 82 of the rods 80 and the bulkhead 8 is, as observed in Figure 2, horizontal. Each of these connections includes a bracket 102 fixed to the bulkhead (as best seen in Figures 1 and 2) which pivotally supports a horizontally swinging bell crank 104 having a generally laterally extending arm 106 and a generally longitudinally extending arm 108. The end 82 of rod 80 is pivotally fastened to the end of the arm 106 by the connection shown in the right-hand part of Figure 8. This connection, as before, includes a tapered eye 110, a resilient bushing 112, a spacer 114, all connected to the end of arm 106 by means of a bolt assembly 116. The ends of the arms 108 are connected by means of links 118 by adjustable connections 120 to a rod 122 which is fixed, as by welding, to a plate 124 in turn bolted to the bracket 127 on bulkhead 8 by means of bolt assemblies 126. The adjustable connections 120 take the form of a clevis assembly 128 which is pinned to one end of the rod 118. The rod 122 is threaded to the clevis 128 and rigidly but adjustably secured thereto by means of the lock nuts 130.

With the construction just described and with the frame free to pivot about the point 34 it may now be appreciated that merely by removing the pin connections at 120 and adjusting the clevis assembly 128 the rod 122 may be adjustably fixed so as to relocate the cranks 104 and the ends of the truck frame to thereby align this truck frame relative to the end 4.

It will be appreciated that when viewing the suspension in elevation a quadrilateral linkage connection is obtained between the frame and the end 4 which prevents any substantial rotation of the frame about the axes 20 relative to the end 4 while at the same time allowing a limited amount of lateral movement of the frame relative to the end 4 and vertical movement of the frame relative to end 4. While it is recognized that a limited amount of this vertical and lateral movement definitely improves the riding characteristics of the vehicle, too much tends to upset the stability thereof.

To prevent excessive lateral movement there has been provided in the present invention unique lateral movement-limiting means the details of which are best shown in Figures 1 and 4. Provided on the underside of the vehicle end 4 are pairs of transversely spaced, vertically depending plates 132. These plates have fixed thereto by means of bolt assemblies 134 a small wedge-like assembly 136. The wedge-like assembly 136 is provided with resilient blocks 138 bonded or otherwise fixed thereto which are interposed between a more or less V-shaped member 140. The member 140 is held in place by upper and lower plates 142 which are adapted to move laterally relative to the wedge-shaped members 136. In order to hold the members 140 and 142 in place a suitable pin 144 extends therethrough and through the wedge-shaped member 136. To enable the plates 140 and 142 to move laterally a suitable elongated slot 146 has been cut in the plate 142. The connection 36, as observed from Figure 1, has protruding abutments 148 which after limited movement of the frame relative to the underside of the end 4 are adapted to alternately engage the plates or members 140. Further lateral movement will place the resilient blocks 138 under both compression and shear to increasingly resist at a very rapid rate any further lateral movement of the frame.

To limit vertical movement of the frame relative to the underside of the end 4 the end 4 (see Figure 2) is provided with rubber bumpers 150 which after predetermined vertical movement of frame 6 and end 4 relative to each other abut cooperating, upwardly projecting stops 152 provided on the upper sides of the wheel pieces 12 intermediate the ends thereof.

It has been found that the air bellows tend to oscillate both vertically and laterally when displaced from their static positions. To damp any such oscillating action the frame 7 has its ends connected to the underside of the end 4 by means of shock absorbing assemblies 154 and 156. It will be noted, however, from the Figures 2 and 3 that while shock absorbing assemblies 154 and 156 extend generally transversely they are oppositely inclined so as to provide suitable damping for both lateral and vertical oscillations. The shock absorbing assemblies 154 are closely horizontal so as to have a greater effect on the transverse or lateral oscillations whereas the shock absorbing assemblies 156 are more or less vertically inclined so as to primarily take care of the vertical oscillations.

In the event that the bellows 28 should become deflated for some reason the truck will still remain substantially stabilized below the underframe of the body 2 because of the connections between the air bellows and the underframe and the air bellows and the frame of the truck coupled with the fact that the vertical limiting devices 150 and 152 will limit the relative vertical movement between the end 4 and the truck assembly 6 caused by deflation of the bellows 128. To further assure that the frame 7 of the truck does not become detached from the body of the vehicle, for example when the body is lifted, suitably U-shaped members 158 are provided at rectangularly spaced locations. These U-shaped members are secured to the underside of the end 4 and embrace the tubular members 14.

From the foregoing description it will be appreciated that a new truck assembly has been provided which consists of a single wheel and axle set and a frame directly supporting one end of a vehicle through the medium of air bellows. The truck is uniquely stabilized while at the same time providing desirable lateral and vertical movement which is uniquely damped and limited. Novel means have been provided for aligning the truck assembly relative to the underside of the vehicle and also for preventing the separation of the truck assembly from the vehicle body.

What we claim is:

1. In combination a railway vehicle end and a single axle suspension therefor comprisng a transversely extending truck frame having journaled therein for rotaton with respect thereto the ends of a wheel and axle set, air bellows interposed between said end frame resiliently supporting said end on said frame for relative lateral movement longitudinally extending arms secured between said end and frame for transmitting movement therebetween, and means to damps vertical movement of said frame relative to said end comprising a transversely extending shock absorbing assembly directly connected between said frame and end and stops associated with said frame and end limiting relative vertical and lateral movement therebetween.

2. In combination a railway vehicle end and a single axle suspension therefor comprising a transversely extending truck frame having journaled therein for rotation with respect thereto the ends of a wheel and axle set, air bellows interposed between said end and frame resiliently supporting said end on said frame for relative lateral movement, longitudinally extending arms pivotally fastened between said end and frame for transmitting movement therebetween, means to damp lateral and vertical movement of said frame relative to said end comprising a pair of longitudinally spaced transversely disposed oppositely inclined shock absorbing assemblies having their opposing ends pivotally connected to said frame and end respectively and resilient stops associated with said frame and end limiting relative vertical and lateral movement therebetween.

3. In a railway vehicle a suspension for one end thereof which includes a transversely extending truck frame journalling the ends of an axle of a wheel and axle set, air bellows interposed between said end and frame resiliently supporting said end on said frame for vertical and lateral movement with respect thereto, and means to stabilize said end and frame relative to each other comprising a longitudinally extending radius rod having its opposite ends pivotally connected to said frame and end respectively, and a second longitudinally extending radius rod transversely and vertically spaced from said first rod and having its opposite ends pivotally connected to said frame and end respectively, the pivotal connections between said rods and frame and end including resilient means to render said connection flexible and permit in conjunction with said air bellows limited lateral movement of said frame relative to said end, and means to damp lateral and vertical movement of said frame relative to said end comprising a pair of longitudinally spaced transversely disposed oppositely inclined shock absorbing assemblies having their opposite ends pivotally connected to said frame and end respectively.

References Cited in the file of this patent

UNITED STATES PATENTS

| | | |
|---|---|---|
| 1,064,167 | Pintner | June 10, 1913 |
| 2,011,918 | Stedefeld et al. | Aug. 20, 1935 |
| 2,268,267 | Sheesley | Dec. 30, 1941 |
| 2,630,079 | Cottrell | Mar. 3, 1953 |
| 2,636,451 | Watter | Apr. 28, 1953 |
| 2,705,926 | Burdick | Apr. 12, 1955 |